Patented May 23, 1950

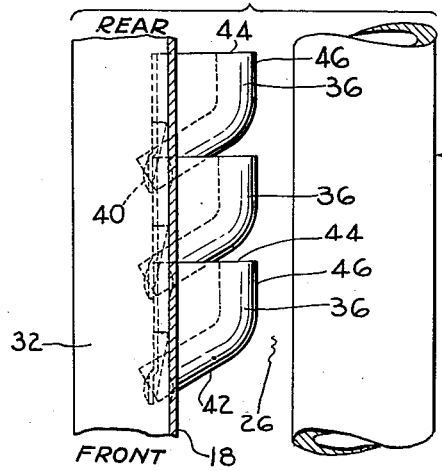
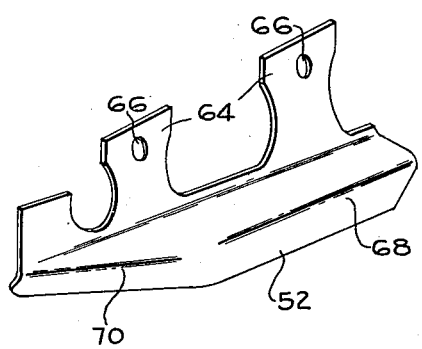
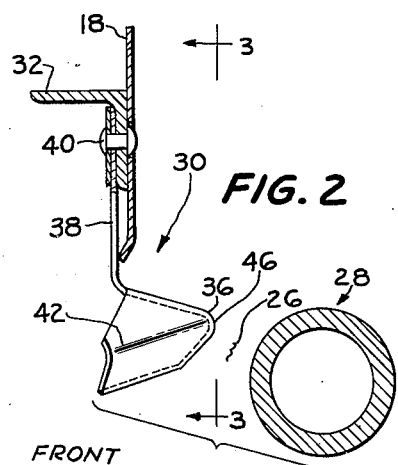
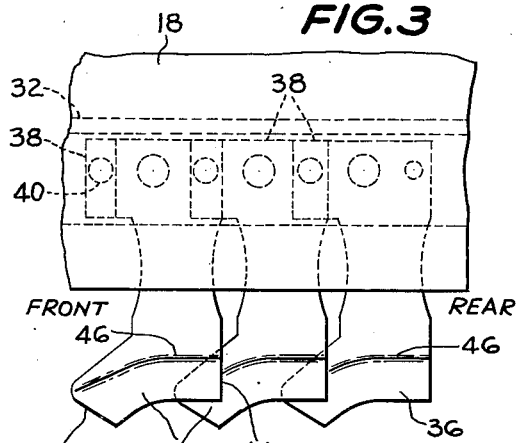
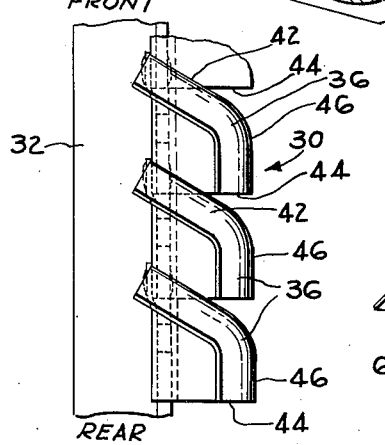
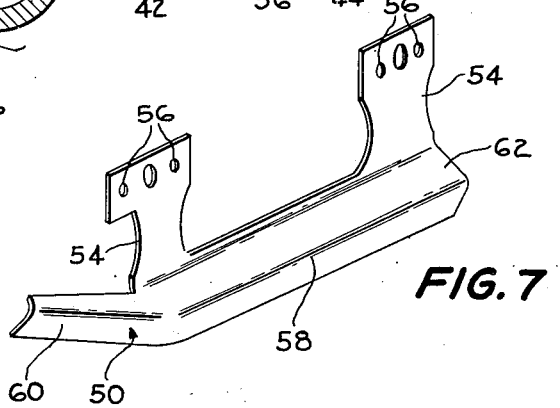

2,508,966

UNITED STATES PATENT OFFICE 2,508,966

GATHERING OR STRIPPING MEANS FOR HARVESTERS

Leonard B. Neighbour and Merrill W. Roscoe, Moline, Ill., assignors to Deere & Company, Moline, Ill., a corporation of Illinois Application September 15, 1948, Serial No. 49,344

4 Claims. (Cl. 56—33)

1

This invention relates to a harvester and more particularly to gatherer or stripper means for harvesters of the row-crop type.

In the harvesting of row crops of the types in which stalk-borne plants grow to varying heights and attain different sizes, it is customary to use a harvester having gathering means including a pair of laterally spaced, fore and aft extending gathering or stripping devices inclined upwardly and rearwardly and between which the stalks pass as the harvester moves forwardly. Ordinarily, one or more of the devices is rotatable about a fore and aft extending, upwardly and rearwardly inclining axis and the cooperation of the gatherer or stripper devices with respect to the stalks passing through the stalk passage therebetween serves to strip the plants or crops from the stalks by driving the stalks downwardly and rearwardly, the stripped or gathered plants being ultimately delivered to an elevator or equivalent means for subsequent discharge into a suitable receptacle.

In typical prior art constructions in which one of the gathering devices is a stripper roller and the other is a parallel stripper bar, it is known to mount one or the other yieldably at one or both ends so that the two may move apart or together in accordance with variations in stalk thicknesses. The same arrangement for yieldability is known in harvesters of the type having a pair of stripper or snapping rolls instead of a single roll and a parallel stripper bar. In either case, however, there is a pronounced disadvantage in that spreading of the devices at any particular point along the stalk passage to accommodate a particularly heavy or thick stalk results in simultaneously spreading the devices apart at other points, whereupon the devices are caused to lose their grip on more slender stalks. As a result, the gatherer or stripper mechanism loses its efficiency and a large number of stalks are left with the plants or crops intact thereon.

According to the present invention, there is provided a harvester having a pair of stripper or gatherer devices arranged generally in the manner described above. However, one of the devices is so constructed that several portions longitudinally thereof are individually flexible for yielding transverse of the direction of movement of stalks through the stalk passage, whereby the stalk passage may be temporarily widened at certain points without effecting increase in width of other portions of the stalk passage. The result is that the flexible device may accom-

2 modate a particularly heavy stalk at one portion thereof without affecting the gathering or stripping function of the devices on more slender stalks received at longitudinally spaced points along the stalk-receiving passage. A related object has to do with the provision of the flexible device in the form of a flexible or resilient structure preferably comprising a plurality of longitudinally spaced individual members arranged in overlapping or shingle-like fashion, the trailing edge of each member overlapping the leading edge of a neighboring member, so that stalks may proceed smoothly upwardly and rearwardly along the stalk-receiving passage. Smooth action of the gathering or stripping device is further accentuated by the provision of tapering or curving leading portions on the members.

The foregoing and other important objects and desirable features inherent in and encompassed by the invention will become apparent to those skilled in the art as the disclosure of a preferred form of the invention is fully made in the following detailed description and accompanying sheets of drawings in which:

Figure 2 is an enlarged transverse sectional view taken substantially through a transverse plane including the line 2—2 of Figure 1;

Figure 3 is a fragmentary side elevational view with the stripper roll omitted, this view being taken along the line 3—3 of Figure 2;

Figures 4 and 5 are respectively top plan and bottom plan views of the structure shown in Figure 2; in Figure 4, the upright wall is shown in section.

Figure 6 is a perspective view of the uppermost flexible member, this view being on a scale substantially one-half of that used in Figures 2–5; and Figure 7 is a perspective view of the lowermost or leading member of the flexible structure, this view being on the same scale as that in Figure 6.

Figure 1:
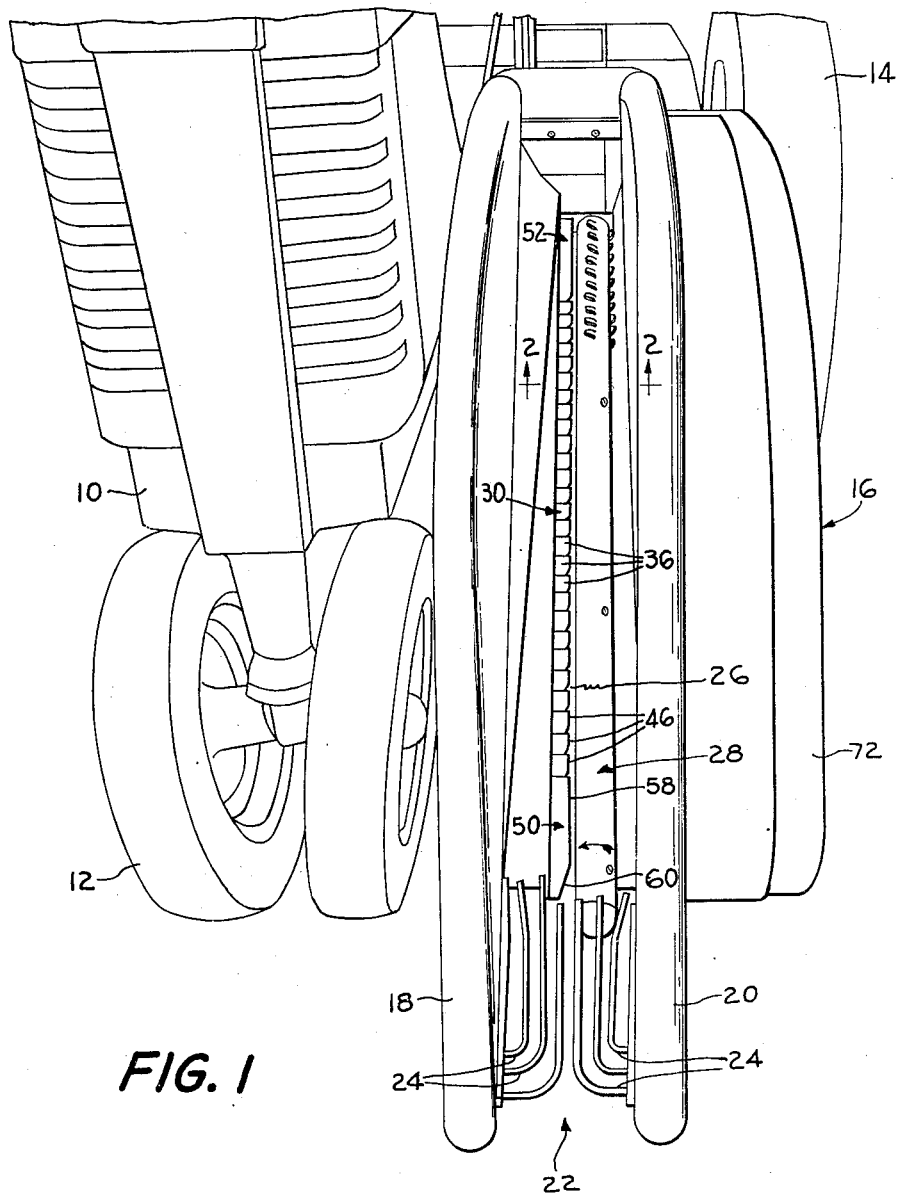
Figure 1 is a perspective view of the forward portion of a harvester of the tractor-mounted type suitable for harvesting cotton by stripping the cotton plants from the stalks.

Although the invention as embodied in the preferred form disclosed here was designed and is intended primarily for the harvesting of cotton, it will be seen that the principles of the invention are applicable to the harvesting of other crops. Therefore, the present illustration and description should be taken as illustrative and not limiting.

The harvester unit illustrated is of the tractor-mounted, one-row type. The tractor is illustrated only generally and has the usual structural components comprising a main body 10, front wheeled truck 12 and a transverse rear axle structure (not visible) carried on a pair of laterally spaced traction wheels, only one of which appears at 14. The harvesting unit is designated generally by the numeral 16 and is here illustrated as being mounted at the left side of the tractor body 10 and ahead of the left-hand traction wheel 14. The harvester unit 16 may be supported on the tractor by any suitable means, the details of which have not been illustrated, since such arrangements are generally well known. The harvester unit and tractor thus make up a mobile frame of the self-propelled type which may be driven forwardly over a field in which stalk-borne plants or crops have been planted in rows.

The harvester unit 16 comprises generally inner and outer side sheets 18 and 20 which extend longitudinally upwardly and rearwardly or in a fore and aft direction as respects the direction of travel of the unit. The side sheets are spaced apart laterally to provide a throat 22 in which the crops are received. Each of the side sheets carries at its forward end or at the entrance of the throat 22 a plurality of deflector rods 24 for the purpose of guiding stalks into a relatively narrow, longitudinally rearwardly and upwardly extending stalk passage, designated generally by the numeral 26.

The stalk-receiving passage 26 is defined by a pair of gatherers or stripper devices designated generally by the numerals 28 and 30. In the present disclosure, the stripper device 28 is an elongated rotary element such as a roll which is appropriately journaled by supporting structure enclosed by the proximate side sheet 20, which structure may be of any general design. The journaling of the stripper roll is such that the roll is rotatable about its principal axis, which extends longitudinally rearwardly and upwardly. The direction of rotation of the roller 28 is indicated in Figure 1.

The other or inner device 30 is in the form of a longitudinally extending flexible structure which is disposed alongside of and generally in parallelism with the roll 28. The device 30 is carried on supporting means including a longitudinally rearwardly and upwardly inclined angle bar 32 (Figures 2, 3, 4 and 5) suitably carried in any appropriate manner by supporting structure concealed by the inner side sheet 18. The primary characteristic of the longitudinal flexible device 30 is that portions thereof proximate to the stripper roll 28 be flexibly constructed or mounted so that portions thereof may flex or yield transversely away from the stripper roll 28 to provide for temporary widening of the stalk passage 26 at portions thereof without effecting the width of other portions of the stalk passage, whereby stalks of varying thicknesses may be accommodated without a uniform increase in width of the stalk passage, thereby eliminating inefficiency of the unit resulting from loss of stripping action on more slender stalks occasioned by spreading of the stripper devices by the entry of heavier or thicker stalks in the stalk passage.

In the preferred form of the invention disclosed here, the device 30 comprises a plurality of longitudinally separated, individual stripper members 36 carried by portions of the angle bar 32 that are in fore and aft alignment. In the present instance, each member 36 is constructed of lightweight sheet metal and is preferably heat-treated to have the characteristic of inherent resiliency or flexibility. For the purpose of mounting on the angle bar 32, each member 36 has a flange or supporting portion 38 appropriately apertured to receive securing means in the form of rivets 40. As shown in Figure 3, the apertured flanges 38 overlap so that certain rivets are common to a pair of neighboring members 36. It will be understood, of course, that the members 36, instead of being inherently flexible, may be relatively rigid and may be mounted on the angle bar 32 by resilient means, the equivalency of which will be readily apparent without illustration.

Each member 36 preferably has the configuration shown in the drawings and includes a leading portion 42 and a trailing portion 44, these expressions being used, of course, with respect to the direction of travel of the unit over the field.

The leading portion 42 is directed forwardly and transversely away from the stalk passage 26 as by being tapered or otherwise relieved as illustrated. The inner or intermediate portion of each member, as at 46, generally parallels the proximate portion of the stripper roller 28 and lies along or defines the inner side of the stalk passage 26.

As best shown in Figures 4 and 5, the members 36 are arranged in overlapping or shingle fashion; that is, the trailing edge 44 of each member 36 overlaps the leading portion of the next rearward member. Inasmuch as the leading portion 42 is tapered or relieved, as illustrated, and inasmuch as each member 36 is individually flexible or resilient, each member may yield or flex away from the stripper roll 28 to a substantial extent without interference of the trailing portion thereof with the leading portion of the next rearward neighboring member. The members 36 are not only flexible transversely away from the stripper roll 28 but are resilient to the extent that they may twist about a vertical axis so that, in the event of extreme deflection by any member because of an extremely thick stalk in the stalk passage 26, engagement of the trailing portion 44 of the deflected member with the leading portion 42 of a following member will not necessarily cause complete lateral displacement of said following member but will result more in a forward displacement of the deflected member. This arrangement contributes further to the feature of providing for temporary widening of the stalk passage 26 at a certain point thereof without affecting the width of the stalk passage at other points thereof. The inclination or taper of the leading portion 42 facilitates the deflection or displacement just referred to because it acts as a cam or wedge in cooperation with the trailing portion of the next forward member.

In the present case, the flexible device 30 is completed by a leading or forward member 50 (Figure 7) and a trailing or rearward member 52 (Figure 6). The member 50 has generally the characteristics of each member 36, except that it is substantially longer than such latter member and is intended primarily as a guide at the entrance to the stalk-receiving passage 26. The member 50 has a pair of attaching flanges 54 which are apertured at 56 for attachment to the angle support 32. The member 50 has an inner longitudinal portion 58 which is substantially straight and which lies along the inner side of the stalk passage 26. The portion 58 is therefore in longitudinal alignment with the straight intermediate portions 46 on the members 36 (Figure 1). The leading portion of the member 50 is tapered at 60 to conform to the stalk-receiving throat 22. Like the members 36, the member 50 is formed of sheet metal having the characteristic of inherent flexibility or resiliency. The member 50 may be deflected laterally away from the stripper roll 28 without effecting widening of the stalk passage 26 at any other point. The trailing portion of the member 50, as at 62, cooperates with the leading portion 42 of the next adjacent member 36 in the same manner as the trailing portion 44 of each member 36 cooperates with the leading portion of the neighboring member.

The member 52 includes a pair of attaching flanges 64 which are apertured at 66 for attachment to the angle bar support 32. This member further has a straight inner portion 68 which lies along that side of the stalk-receiving passage 26 defined by the portion 58 on the member 50 and by the intermediate portions 46 on the members 36. The forward or leading portion of the member 52 is tapered or relieved at 70 and is overlapped by the trailing portion 44 of the next preceding member 36, the relationship between such portion 44 and the portion 70 being similar to that between the trailing portion 44 of one member and a leading portion 42 of a neighboring member.

In the operation of a unit equipped with the devices 28 and 30, the unit is propelled forwardly over the field and stalks entering the throat 22 are received in the passage 26. The inclination of the devices accommodates stalks of different heights and the individual yieldability of the various portions of the flexible device 30 accommodates stalks of different thicknesses. It has been found in cotton fields, for example, that the variations in stalk thickness may be from one-half inch to an inch and one-half, particularly at the ends of rows, at which points the end plants seem to grow heavier because they draw more moisture. The same result may occur in between the ends of a row where intervals are occasioned by the failure of plants to grow, in which cases the plants bordering on such intervals are particular heavy.

In any event, the unit moves forwardly to receive stalks in the passage 26 and the plants are stripped from the stalks by the rotating roll 28 in combination with the device 30. The stripped plants fall through an opening (not shown) in the outer side sheet 20 and into means enclosed within a housing 72 associated with the outer side sheet 20. Whatever means is provided in the housing 72 serves, as is conventional, to carry the stripped plants to a convenient point of discharge. Such means has not been illustrated in more than a representative fashion in view of the fact that such means form no part of the present invention and, moreover, various types of constructions in this respect are well known to those versed in the art.

What is claimed is:

1. For a harvester of the type having a mobile frame adapted to be moved forwardly over a field of stalk-borne plants or the like and including an elongated stripper element extending generally fore and aft as respects the direction of travel of the harvester: means for disposition alongside the stripper element in transversely spaced relation thereto to define one side of a fore and aft extending stalk-receiving passage of which the other side is defined by said stripper element, said means comprising a support including portions generally alined fore and aft and spaced transversely from said stripper element; and a plurality of individual, longitudinally separated stripper members mounted on the support and extending into proximity to the stripper element and terminating at said one side of the stalk-receiving passage for plant-stripping cooperation with the stripper element, each member having a leading portion thereof directed forwardly and transversely away from said one side of the stalk-receiving passage, and an inner portion proximate to and generally parallel to the stripper element; and said members being arranged in a longitudinal series substantially coextensive with the stripper element and being individually flexible generally transversely of the stalk passage to provide for temporary widening of part of said passage without widening of other parts of the passage.

2. The invention defined in claim 1, further characterized in that: the inner portions of the stripper members are alined lengthwise on a straight line substantially parallel to the stripper element; and each stripper member has a trailing portion overlapping the leading portion of the neighboring rearward stripper member.

3. The invention defined in claim 2, further characterized in that: the overlapped leading portion of each member is generally transversely relieved to provide for limited flexing of a neighboring forward member without interengagement of proximate trailing and leading portions.

4. The invention defined in claim 3, further characterized in that: each member is flexibly mounted for flexing thereof both transversely and longitudinally of the stalk-receiving passage.

LEONARD B. NEIGHBOUR.
MERRILL W. ROSCOE.

REFERENCES CITED

The following references are of record in the file of this patent:

UNITED STATES PATENTS

| Number | Name | Date |
|---|---|---|
| 1,160,777 | Small | Nov. 16, 1915 |
| 1,177,120 | Manners | Mar. 28, 1916 |
| 1,898,757 | Bockmann | Feb. 21, 1933 |
| 2,045,633 | Court | June 30, 1936 |
| 2,406,058 | Boone | Aug. 20, 1946 |